US010316268B2

(12) United States Patent
Goodrich et al.

(10) Patent No.: US 10,316,268 B2
(45) Date of Patent: Jun. 11, 2019

(54) PROCESS FOR REMOVING CHLOROPROPANOLS AND/OR GLYCIDOL, OR THEIR FATTY ACID ESTERS, FROM GLYCERIDE OIL, AND AN IMPROVED GLYCERIDE OIL REFINING PROCESS COMPRISING THE SAME

(71) Applicants: The Queen's University of Belfast, Belfast (GB); Evonik Degussa GmbH, Essen (DE)

(72) Inventors: Peter Goodrich, Antrim (GB); Eoghain O'Hara, Antrim (GB); Martin Atkins, Antrim (GB); Christopher K. Hamer, Antrim (GB); Daniel Witthaut, Essen (DE); Gabriela Fedor, Essen (DE); Ulrich Boes, Essen (DE)

(73) Assignees: THE QUEEN'S UNIVERSITY OF BELFAST, Belfast, Antrim (GB); EVONIK DEGUSSA GMBH, Essen (DE)

(*) Notice: Subject to any disclaimer, the term of this patent is extended or adjusted under 35 U.S.C. 154(b) by 0 days.

(21) Appl. No.: 15/576,003

(22) PCT Filed: May 27, 2016

(86) PCT No.: PCT/GB2016/051558
§ 371 (c)(1),
(2) Date: Nov. 21, 2017

(87) PCT Pub. No.: WO2016/189328
PCT Pub. Date: Dec. 1, 2016

(65) Prior Publication Data
US 2018/0148665 A1 May 31, 2018

(30) Foreign Application Priority Data
May 27, 2015 (GB) .................... 1509086.3

(51) Int. Cl.
C11B 3/06 (2006.01)
A23D 9/04 (2006.01)
C11B 3/00 (2006.01)

(52) U.S. Cl.
CPC ............ *C11B 3/06* (2013.01); *A23D 9/04* (2013.01); *C11B 3/006* (2013.01); *Y02E 50/13* (2013.01)

(58) Field of Classification Search
CPC .................... C11B 3/06; C11B 3/14
See application file for complete search history.

(56) References Cited

U.S. PATENT DOCUMENTS

| 2,769,827 A | 11/1956 | Clayton |
| 2,771,480 A | 11/1956 | Chasanov |
| 3,634,475 A | 1/1972 | Beal |
| 4,199,440 A | 4/1980 | Verachtert |
| 4,533,501 A | 8/1985 | Sen Gupta |
| 4,629,588 A | 12/1986 | Welsh et al. |
| 4,915,876 A | 4/1990 | Lindsay |
| 4,959,158 A | 9/1990 | Meikrantz |
| 5,243,059 A | 9/1993 | Ibuki et al. |
| 5,362,893 A | 11/1994 | Muylle et al. |
| 5,571,070 A | 11/1996 | Meikrantz et al. |
| 5,591,340 A | 1/1997 | Meikrantz et al. |
| 5,762,800 A | 6/1998 | Meikrantz et al. |
| 6,395,948 B1 | 5/2002 | Hope et al. |
| 6,407,271 B1 | 6/2002 | Deffense |
| 2001/0005759 A1 | 6/2001 | Bertholet |
| 2002/0169071 A1 | 11/2002 | Sauvage et al. |
| 2002/0198100 A1 | 12/2002 | Mehnert et al. |
| 2003/0085156 A1 | 5/2003 | Schoonover |
| 2005/0010076 A1 | 1/2005 | Wasserscheid et al. |
| 2006/0070919 A1 | 4/2006 | Vallee et al. |
| 2006/0128996 A1 | 6/2006 | Vaultier et al. |
| 2007/0142685 A1 | 6/2007 | Elomari et al. |
| 2008/0134987 A1 | 6/2008 | Lee et al. |
| 2008/0306319 A1 | 12/2008 | Earle et al. |
| 2009/0326228 A1 | 12/2009 | Vaultier et al. |
| 2010/0187481 A1 | 7/2010 | Bodesheim et al. |
| 2010/0324318 A1 | 12/2010 | Prakash et al. |
| 2011/0027431 A1 | 2/2011 | Fan |
| 2011/0146135 A1 | 6/2011 | Brandvold |
| 2011/0207953 A1 | 8/2011 | Corley et al. |

(Continued)

FOREIGN PATENT DOCUMENTS

| CN | 102031202 B | 12/2012 |
| CN | 106281672 A | 1/2017 |

(Continued)

OTHER PUBLICATIONS

Ahmed Samy M. Abd El-Salam, et al.; "Deacidification of High-acid Olive Oil", Food Processing & Technology, 2011, pp. 1-7.
Ermitas Alcade, et al.; "A Simple Halide-to-Anion Exchange Method for Heteroaromatic Salts and Ionic Liquids", Molecules 2012, vol. 17, pp. 4007-4027, Issn 1420-3049, www.mdpi.com/journal/molecules.
Sonia Abello, et al.; "Supported choline Hydroxide (ionic liquid) as Heterogeneous Catalyst for Aldol Condensation Reactions", ChemComm, www.rsc.org/chemcomm, 2004, pp. 1096-1097.
Amanda C. Cole, et al.; "Novel Bronsted Acidic Ionic Liquids and Their Use as Dual Solvent-Catalysts", JACS Communications, 2002, vol. 124, No. 21, pp. 5962-5963.
Frederic DeStaillats, et. al.; "Glycidyl Esters in Refined Palm (Elaeis Guineensis) Oil and Related Fractions. Part I: Formation Mechanism", Food Chemistry, vol. 131, 2012, pp. 1391-1398.

(Continued)

*Primary Examiner* — Yate' K Cutliff
(74) *Attorney, Agent, or Firm* — Ryan T. Grace; Advent, LLP

(57) ABSTRACT

The present invention is directed to a basic ionic liquid treatment for removing chloropropanol and/or glycidol, or their fatty acid esters, from glyceride oil, as well as a process for refining glyceride oil which includes the basic ionic liquid treatment. The present invention also relates to uses of the basic ionic liquid and glyceride oil compositions obtained from the ionic liquid treatment.

20 Claims, No Drawings

(56) References Cited

U.S. PATENT DOCUMENTS

| | | | |
|---|---|---|---|
| 2012/0132564 | A1 | 5/2012 | Hardacre et al. |
| 2013/0323394 | A1 | 12/2013 | Bruse et al. |
| 2014/0091008 | A1 | 4/2014 | Hardacre et al. |
| 2014/0121397 | A1 | 5/2014 | Kase et al. |
| 2017/0022447 | A1 | 1/2017 | Atkins et al. |
| 2017/0107449 | A1 | 4/2017 | Hruschka et al. |
| 2018/0134987 | A1 | 5/2018 | Fedor et al. |
| 2018/0134988 | A1 | 5/2018 | Fedor et al. |
| 2018/0148665 | A1 | 5/2018 | Goodrich et al. |

FOREIGN PATENT DOCUMENTS

| | | | | |
|---|---|---|---|---|
| DE | 19638459 | A1 | 3/1998 | |
| DE | 102013010035 | A1 | 12/2014 | |
| EP | 0791643 | A1 | 8/1997 | |
| EP | 1911829 | A1 * | 4/2008 | ............ C10G 21/27 |
| EP | 2502500 | A1 | 9/2012 | |
| FR | 2861084 | A1 | 4/2005 | |
| GB | 499678 | A | 1/1939 | |
| GB | 708831 | A | 5/1954 | |
| GB | 764833 | A | 1/1957 | |
| GB | 912623 | A | 12/1962 | |
| GB | 1520523 | A | 8/1978 | |
| GB | 2068404 | A | 8/1981 | |
| JP | 08302382 | A | 11/1996 | |
| JP | 2000202299 | A | 7/2000 | |
| JP | 2006160969 | A | 6/2006 | |
| JP | 2013250186 | | 12/2013 | |
| WO | 9912650 | A1 | 3/1990 | |
| WO | 9421765 | A1 | 9/1994 | |
| WO | 0029120 | A1 | 5/2000 | |
| WO | 0046322 | A1 | 8/2000 | |
| WO | 0068236 | A1 | 11/2000 | |
| WO | 03075671 | A1 | 9/2003 | |
| WO | 2006072775 | A2 | 7/2006 | |
| WO | 2007101397 | A1 | 9/2007 | |
| WO | 2007138307 | A2 | 12/2007 | |
| WO | 2010063450 | A1 | 6/2010 | |
| WO | 2010136783 | A1 | 12/2010 | |
| WO | 2011005081 | A1 | 1/2011 | |
| WO | 2011009841 | A1 | 1/2011 | |
| WO | 2011009843 | A1 | 1/2011 | |
| WO | WO 2011/009843 | * | 1/2011 | ............ C11B 3/14 |
| WO | 2011069028 | A1 | 6/2011 | |
| WO | 2012004810 | A1 | 1/2012 | |
| WO | 2012031176 | | 3/2012 | |
| WO | 2012035020 | A1 | 3/2012 | |
| WO | 2012069632 | A1 | 5/2012 | |
| WO | 2012069832 | A2 | 5/2012 | |
| WO | 2012130747 | A1 | 10/2012 | |
| WO | 2012169718 | A1 | 12/2012 | |
| WO | 2013093093 | A1 | 6/2013 | |
| WO | 2014012548 | | 1/2014 | |
| WO | 2014042937 | A1 | 3/2014 | |
| WO | 2015031857 | A2 | 3/2015 | |
| WO | 2015079262 | A1 | 6/2015 | |
| WO | 2015185657 | A1 | 12/2015 | |
| WO | 2016005769 | A1 | 1/2016 | |
| WO | 2016149692 | A1 | 9/2016 | |
| WO | 2016189330 | A1 | 12/2016 | |
| WO | 2016189333 | A1 | 12/2016 | |

OTHER PUBLICATIONS

Brian D. Craft, et al.; "Formation Mechanisms", Nestle Research Center, Food Science and Technology Department, pp. 7-21.

A.J. Dijkstra, et al.; "Determination of Trace Elements in Oils by Plasma Emission Spectroscopy", The Journal of the American Oil Chemists' Society, 1982, vol. 59, pp. 199-204.

Frank Pudel, et al.; "On the Necessity of Edible Oil Refining and Possible Sources of 3-MCPD and Glycidyl Esters", Eur. J. Lipid Sci Technol., 2011, pp. 368-373.

Susanne Andres, et. al.; "Toxicology, Occurrence and Risk Characterisation of the Chloropropanols in Food: 2-Monochloro-1,3-Propanediol, 1,3-Dichloro-2-Propanaol and 2,3-Dichloro-1-Propanol", Food and Chemical Toxicology 58, 2013, pp. 467-478.

Troy D. Haines, el al.; "Direct Determination of MCPD Fatty Acid Esters and Glycidyl Fatty Acid Esters in Vegetable Oils by LC-TOFMS", Journal of the American Oil Chemists' Society, 2011, pp. 1-14.

John Christian Larsen, "3-MCPD Esters in Food Products", International Life Sciences Institute Report Series, Summary Report of Workshop, 2009, Belgium.

Marina S. Manic, et al.; Extraction of Free Fatty Acids from Soybean Oil Using Ionic Liquids or Poly(ethyleneglycol)s, AIChE Journal, May 2011 vol. 57, No. 5, pp. 1344-1355.

Bertrand Matthaus, et. al.; "Strategies for the Reduction of 3-MCPD Esters and Related Compounds in Vegetable Oils", Eur. J. Lipid Sci. Technol., 2011, vol. 113, pp. 380-386.

Bertrand Matthaus, "Organic or Not Organic—That is the Question: How the Knowledge About the Origin of Chlorinated Compounds Can Help to Reduce Formation of 3-MCPD Esters", Eur. J. Lipid Sci. Technol. 2012, vol. 114, pp. 1333-1334.

Christianne E. C. Rodrigues, et. al.; "Deacidification of Vegetable Oils by Solvent Extraction", Recent Patents on Engineering 2007, vol. 1, pp. 95-102.

K. Nagy, et al.; "Mass-Defect Filtering of Isotope Signatures to Reveal the Source of Chlorinated Palm Oil Contaminants", Food Additives & Contaminants: Part A, vol. 28, No. 11, Nov. 2011, pp. 1492-1500.

Peter Nockemann, et. al.; "Task-Specific Ionic Liquid for Solubilizing Metal Oxides", J. Phys. Chem. B, 2006, vol. 110, pp. 20978-20992.

Marcin Smiglak, et. al.; "New Hydrogen Carbonate Precursors for Efficient and Byproduct-Free Syntheses of Ionic Liquids Based on 1,2,3-Trimethylimidazaolium and N, N-Dimethylpyrrolidinium Cores", Green Chem., 2010, vol. 12, pp. 491-501.

Rudiger Weibhaar, "Determination of Total 3-Chloropropane1,2-diol (3-MCPD) in Edible Oils by Cleavage of MCPD Esters with Sodium Methoxide", Eur. J. Lipid Sci. Technol., 2008, vol. 110, pp. 183-186.

Shin-Ichi Ishig82, No. 10, pp. 1927-1941, 2010.

Noor Akhmazillah, et al.; "Trace metals content (contaminants) as initial indicator in the quality of heat treated palm oil whole extract", International Journal of Energy and Environment, 2011, vol. 2, Issue 4, pp. 671-676.

Aleksandra Szydlowska-Czerniak, et al.: "Spectroscopic Determination of Metals in Palm Oils from Different Stages of the Technological Process", Journal of Agricultural and Food Chemistry, 2013, vol. 61, pp. 2276-2283.

Ulf Strijowski, et al.; "Removal of 3-MCPD esters and related substances after refining by adsorbent material", Eur. J. Lipid Sci. Techol. 2011, vol. 113, pp. 387-392.

Notification of Transmittal of the International Search Report and the Written Opinion of the International Searching Authority—dated Jul. 27, 2016.

* cited by examiner

PROCESS FOR REMOVING CHLOROPROPANOLS AND/OR GLYCIDOL, OR THEIR FATTY ACID ESTERS, FROM GLYCERIDE OIL, AND AN IMPROVED GLYCERIDE OIL REFINING PROCESS COMPRISING THE SAME

The present invention is directed to a basic ionic liquid treatment for removing chloropropanol and/or glycidol, or their fatty acid esters, from glyceride oil, as well as a process for refining glyceride oil which includes the basic ionic liquid treatment. The present invention also relates to uses of the basic ionic liquid and glyceride oil compositions obtained from the ionic liquid treatment.

There are a plethora of glyceride oils that may be extracted from natural sources for human or animal consumption, or for other domestic and commercial uses, including use in bio-diesel. Such glyceride oils include, for example, vegetable oils, marine oils and animal fats and oils. Typically, it is necessary for glyceride oils to undergo refining before their use which can vary depending on the particular oil and the associated level and nature of any contamination following extraction and also depending, for instance, on the desired organoleptic properties of the refined oil.

Glyceride oils, particularly vegetable oils, have numerous applications and are typically associated with use in bio-diesel applications, food preparation and food additives, and even as additive in cosmetics and cleaning products. For example, palm oil, soybean oil, rapeseed oil (canola oil) and corn oil are known to have both food and non-food applications.

In order to be rendered edible crude glyceride oils must undergo a refining process to remove unwanted components. Crude palm oil comprises mono-, di- and triglycerides, carotenes, sterols, as well as free fatty acids (FFA), which are not esterified with glycerol to any extent. FFA leads to degradation of the oil and an increase in rancidity and is thus one of a number of components that the refining process seeks to remove. Other possible contaminants of glyceride oils, the removal of which has become critically important, are chloropropanol and/or glycidol, or their fatty acid esters.

Unbound chloropropanol, particularly 3-MCPD, has been identified in numerous soy based products including, for example, soy sauce, as well as acid-hydrolysed vegetable protein. Meanwhile, chloropropanols and glycidol in the form of their fatty acid esters have been found to accumulate in glyceride oil, particularly refined oil which has been exposed to high temperatures, for example as a result of the refining process. Upon consumption, fatty acid esters of chloropropanols and glycidol are hydrolysed by lipases in the gastrointestinal tract, releasing free chloropropanols and glycidol. Chloropropanols typically exist in the form of monochloropropandiols, 2-chloro-1,3-propanediol (2-MCPD) and 3-chloro-1,2-propanediol (3-MCPD), or the corresponding dichloropropanols derived therefrom, 2,3-dichloropropan-1-ol (2,3-DCP) and 1,3-dichloropropan-2-ol (1,3-DCP) respectively.

The most common chloropropanol associated with the consumption of refined edible glyceride oils is 3-MCPD, which has been found to exhibit genotoxic carcinogenic effects in in vitro testing. As a result, the Joint FAO/WHO Expert Committee on Food Additives (JECFA) established a provisional maximum tolerable daily intake (TDI) of 2 µg/Kg body weight for 3-MCPD in 2001, which was retained on review of new studies in 2006. Investigations into the potential carcinogenic effects of the other free chloropropanols have also been undertaken (Food Chem Toxicol, 2013, August; 58: pages 467 to 478).

Fatty acid esters of chloropropanols are thought to be produced from a mono- or di-glyceride via the formation of a cyclic acyloxonium ion followed by ring opening with a chloride ion (Destaillats, F.; Craft, B. D.; Sandoz, L.; Nagy, K.; *Food Addit. Contam.* 2012b, 29, 29-37), as illustrated below where $R_1$=H (monoglyceride) or C(O)R (diglyceride); 1=2-MCPD ester; and 2=3-MCPD ester).

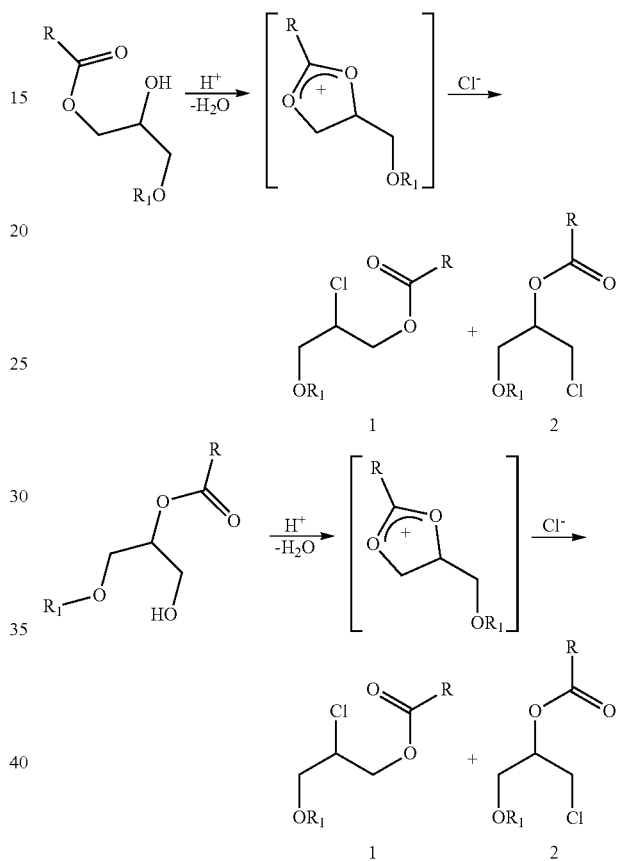

The International Life Sciences Institute (ILSI) Europe Report Series entitled "3-MCPD Esters in Food Products" by John Christian Larsen (October 2009) provides an overview of recent opinion with respect to 3-MCPD esters and their contamination in native, unrefined fats and oils, as well as refined fats and oils. Reported therein is an investigation conducted by Chemisches and Veterinäruntersuchungsamt (CVUA, Stuttgart, Germany), which indicated that traces of 3-MCPD esters can be found in some native, unrefined fats and oils. Meanwhile, significant amounts of 3-MCPD esters were found in nearly all refined fats and oils.

Deodorisation was identified as the crucial step in the refining process leading to formation of 3-MCPD esters. However, it was also found that there is some formation as a result of bleaching, for instance with bleaching earth. Furthermore, an acidic pre-treatment of crude oil, for instance with hydrochloric or phosphoric acids as part of degumming was also found to exacerbate 3-MCPD ester formation. The survey classified the refined vegetable oils and fats which were tested as part of the survey according to the level of 3-MCPD found to be ester-bound therein, shown below:

Low level (0.5-1.5 mg/kg): rapeseed, soybean, coconut, sunflower oil

Medium level (1.5-4 mg/kg): safflower, groundnut, corn, olive, cottonseed, rice bran oil High level (>4 mg/kg): hydrogenated fats, palm oil and palm oil fractions, solid frying fats.

It is also reported that fatty acid esters of glycidol have also been detected in refined glyceride oils. Glycidyl ester (GE) is another known contaminant which has been classified by the International Agency for Research on Cancer (IARC) as "probably carcinogenic to humans" (IARC Group 2A) and their formation, for instance during heat treatment of vegetable fat, has raised additional safety concerns (IARC, 2000). Glycidyl fatty acid esters are thought to derive from the same acyloxonium intermediate from which fatty acid esters of 3-MCPD and 2-MCPD are formed. Rather than nucleophilic attack of the acyloxonium with a chloride ion, the glycidyl ester is formed as a result of deprotonation and epoxide formation of an acyloxonium intermediate derived from a monoglyceride, as illustrated below.

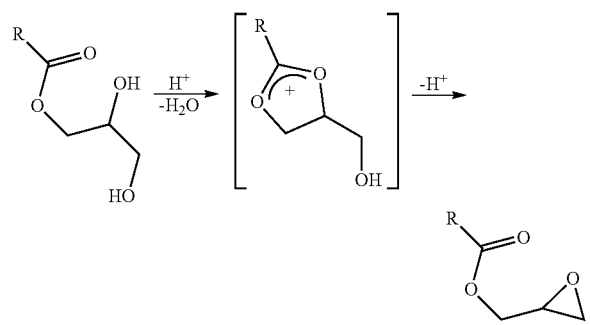

This is supported by the above ILSI report which states that, in the absence of sufficient amounts of chloride ions in the crude oil, the reaction ends with glycidyl fatty acid ester formation. In contrast, under the conditions of analysis conducted in the above CVUA investigation, involving addition of sodium chloride, it is reported that glycidol nearly quantitatively reacts to form 3-MCPD. There are strong indications that a significant amount (10 to 60%) of measured bound 3-MCPD does in fact derive from fatty acid esters of glycidol formed as a result of the analysis itself.

Glycidyl fatty acid ester is, however, believed to derive predominantly from diglyceride as a result of a heat promoted intramolecular elimination reaction, as illustrated below (Destaillats, F.; Craft, B. D.; Dubois, M.; Nagy, *Food Chem*. 2012a, 131, 1391-1398).

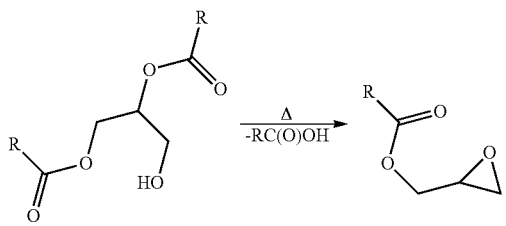

Water used as a strip stream for deodorisation was initially suspected of providing a source of chloride, thereby exacerbating the formation of chloropropanol fatty acid esters and glycidyl fatty acid esters. However, this was shown not to be the case (Prudel et al., Eur, J. Lipid Sci. Technol. 2011, 113, 368-373) and it has instead been suggested that the chlorine donor must instead be present in the oil in an oil-soluble form to enable the formation of chloropropanols (Matthaus et al., Eur, J. Lipid Sci. Technol. 2011, 113, 380-386).

Inorganic sources of chloride typically found in glyceride oils include iron [III] chloride (a coagulant in water treatment), KCl or ammonium chloride (used to improve plant growth), and calcium and magnesium chlorides. Meanwhile, organochlorine compounds present in crude glyceride oils can be converted to reactive chlorinated compounds such as hydrogen chloride, for instance as a result of thermal decomposition, which can react with acyl glycerols as illustrated above. The organochlorines may be endogenously produced by plants during maturation (Matthäus, B., *Eur. J. Lipid Sci. Technol.* 2012, 59, 1333-1334; Nagy, K.; Sandoz, L.; Craft, B. D.; Destaillats, F.; *Food Addit. Contam.* 2011, 28, 1492-1500; and "Processing Contaminants in Edible Oils-MCPD and Glycidyl Esters", *AOCS Press*, 2014, Chapter 1).

As mentioned above, the prevalence of fatty acid esters of chloropropanols and glycidol in glyceride oils increases substantially upon exposure to elevated temperatures and other process conditions associated with refining. Typically, phospholipid-containing glyceride oils such as crude palm oil undergo degumming with aqueous phosphoric acid and/or aqueous citric acid to remove hydratable and non-hydratable lipid components and other unwanted substances before FFA are removed. FFA are removed to improve organoleptic properties and oil stability. Deacidification in conventional processing is either by a chemical route (neutralisation) through the addition of a strong base such as sodium hydroxide ("chemical refining") or by means of a physical route such as steam stripping ("physical refining"). Edible oil refining also typically includes bleaching (e.g. with bleaching earth or clay) and deodorisation (which may also be used to remove FFA) before the refined glyceride oil is considered fit for commercial use. Several methods have now been proposed in the prior art for the removal of fatty acid esters of chloropropanols and glycidol, or their precursors, from edible glyceride oils as part of the overall refining process.

WO 2011/009843 describes a process for removing ester bound MCPD by stripping vegetable oil or fat with an inert gas, such as nitrogen, during deodorisation instead of steam stripping. The process is performed at temperatures of above 140° C. and below 270° C. and therefore offers no significant energy savings over conventional glyceride oil refining processes.

Eur, J. Lipid Sci. Technol. 2011, 113, 387-392 discloses a method of removal of 3-MCPD fatty acid esters and glycidyl fatty acid esters from palm oil using a calcined zeolite and synthetic magnesium silicate adsorbent. WO 2011/069028 also discloses a process for removing glycidyl fatty acid esters from vegetable oil by contacting with an adsorbent, such as magnesium silicate, silica gel and bleaching clay, before steam refining and deodorizing the oil. Issues with the use of adsorbents include the potential for neutral oil losses and the lack of adsorbent recycle options which can have a significant impact on the economic viability of preparing refined glyceride oil.

It is also known, for instance from U.S. Pat. No. 2,771,480, that ion exchange resins can be used for removing FFA, colour-bodies, gums and flavour materials from glyceride oils by adsorption of these impurities onto ion-exchange resins. WO 2011/009841 describes the use of an ion exchange resin, such as carboxymethyl cellulose, for selectively binding species involved in the formation of MCPD esters, or the esters themselves, during the deodorisation process.

As an alternative, WO 2012/130747 describes a process for removing chlorinated contaminants from crude plant oil by means of a liquid-liquid extraction with a polar solvent solution, for example an acidified ethanol-water solution, which is non-miscible with the plant oil. The polar solvent phase is discarded following the extraction before the oil undergoes further refinement.

Liquid-liquid extraction techniques with polar solvents have previously been disclosed as oil treatments for glyceride oils, for instance for the removal of FFA, operating on the basis of the solubility differences of the contaminant and the oil effecting separation by selective partitioning into a particular solvent phase. Meirelles et al., Recent Patents on Engineering 2007, 1, 95-102, gives an overview of such approaches to the deacidification of vegetable oils. Liquid-liquid extraction methods are generally considered to be advantageous on the basis that they may be performed at room temperature, they do not generate waste products and they benefit from low neutral oil losses. However, Meirelles et al. observe that there are significant capital costs associated with the implementation of a liquid-liquid extraction process and there remain doubts as to the overall benefits. Moreover, the polar solvents used in these liquid-liquid extraction techniques are often capable of also removing mono- and di-glycerides from the oil in addition to FFA, which may not be desirable.

It would be beneficial if there was an alternative glyceride oil treatment which was capable of removing chloropropanol, chloropropanol fatty acid esters, glycidol and glycidol fatty acid esters and which could be readily integrated into a conventional glyceride oil refining process.

The present invention derives from the surprising discovery that certain basic ionic liquids comprising a basic anion can be advantageously utilised for the removal of chloropropanol and/or glycidol, or their fatty acid esters, from glyceride oil, which treatment can be readily integrated into the overall glyceride oil refining process. In addition, treatment of glyceride oil with the basic ionic liquid has been found to at least partially remove pigments and odiferous compounds which are typically removed in a separate bleaching step and a high temperature (for example, 240° C. to 270° C.) deodorization step respectively during conventional refining processes. Treatment of glyceride oil with the basic ionic liquid means that lower temperatures and/or time periods can be used for the deodorization step as part of the overall refining process and less extensive degumming and/or bleaching may be required, if at all. This has the advantage of reducing energy requirements and materials costs associated with the refining process.

In one aspect, the present invention provides a process for removing chloropropanol and/or glycidol, or their fatty acid esters, from glyceride oil comprising the steps of:
(i) contacting glyceride oil comprising chloropropanol and/or glycidol, or their fatty acid esters, with a basic ionic liquid to form a treated glyceride oil; wherein the basic ionic liquid comprises a basic anion selected from hydroxide, alkoxide, alkylcarbonate, hydrogen carbonate, carbonate, serinate, prolinate, histidinate, threoninate, valinate, asparaginate, taurinate and lysinate; and an organic quaternary ammonium cation; and
(ii) separating the treated glyceride oil from an ionic compound comprising the organic quaternary ammonium cation after contacting the glyceride oil with the basic ionic liquid; wherein the treated glyceride oil has a reduced concentration of chloropropanol and/or glycidol, or their fatty acid esters, compared to the glyceride oil contacted in step (i).

In some embodiments, the total concentration of monochloropropanol and fatty acid esters thereof in the glyceride oil contacted in step (i) is at least 0.01 ppm, for example at least 0.1 ppm, at least 0.5 ppm or at least 1.0 ppm. In exemplary embodiments, the total concentration of monochloropropanol and fatty acid esters thereof, in the glyceride oil contacted in step (i) may be from 0.01 ppm to 30 ppm, from 1 ppm to 25 ppm, or from 1.5 ppm to 20 ppm.

Preferably, the treated glyceride oil separated in step (ii) has a total concentration of monochloropropanol and fatty acid esters thereof which is at least 50 wt. %, more preferably at least 75 wt. %, lower than that of the glyceride oil contacted in step (i).

In the above embodiments, the method by which the total concentration of monochloropropanol and fatty acid esters thereof is suitably determined is by DGF standard method C-VI 18 (10) A or B. These are indirect methods for determining the total concentration of monochloropropanol and fatty acid esters thereof, where fatty acid esters of monochloropropanol are converted to non-bound monochloropropanol by methanolysis under alkali conditions and followed by GC-MS analysis. In either method A or B, the methodology negates any impact of the presence of fatty acid esters of glycidol in the sample either by a removal step (method A) or by using NaBr rather than NaCl as part of the method (method B) to prevent conversion of fatty acid esters of glycidol to fatty acid esters of monochloropropanol.

In some embodiments, the total concentration of glycidyl fatty acid esters in the glyceride oil contacted in step (i) is at least 0.1 ppm, for example at least 1.0 ppm, at least 2.0 ppm or at least 5 ppm. In exemplary embodiments, the total concentration of glycidyl fatty acid esters thereof, in the glyceride oil contacted in step (a) may be from 0.1 ppm to 30 ppm, from 1 ppm to 25 ppm, or from 1.5 ppm to 20 ppm. Preferably, the treated glyceride oil separated in step (ii) has a total concentration of glycidyl fatty acid esters which is at least 50 wt. %, more preferably at least 75 wt. %, lower than that of the glyceride oil contacted in step (i).

In the above embodiments, the method by which the total concentration of glycidyl fatty acid esters is suitably determined by a combination of DGF standard method C-VI 17 (10) and DGF standard method C-VI 18 (10) A or B. DGF standard method C-VI 17 (10) is used to determine the total concentration of monochloropropanol and glycidol and their fatty acid esters whilst DGF standard method C-VI 18 (10) A or B determines the concentration of monochloropropanol and their fatty acid esters alone, as discussed above. Employing both methods allows for the concentration of glycidyl fatty acid esters to be determined indirectly by subtracting the determined concentration of monochloropropanol and their fatty acid esters from the determined sum of monochloropropanol and fatty acid esters thereof together with glycidyl esters.

In another aspect, the present invention provides a process for refining glyceride oil comprising the steps of:
i) contacting glyceride oil comprising chloropropanol and/or glycidol, or their fatty acid esters, with a basic ionic liquid to form a treated glyceride oil; wherein the basic ionic liquid comprises a basic anion selected from hydroxide, alkoxide, alkylcarbonate, hydrogen carbonate, carbonate, serinate, prolinate, histidinate, threoninate, valinate, asparaginate, taurinate and lysinate; and an organic quaternary ammonium cation;

ii) separating the treated glyceride oil from an ionic compound comprising the organic quaternary ammonium cation after contacting the glyceride oil with the basic ionic liquid, wherein the treated glyceride oil has a reduced concentration of chloropropanol and/or glycidol, or their fatty acid esters, compared to the glyceride oil contacted in step (i); and wherein the process further comprises subjecting the glyceride oil to at least one refining step before and/or after contacting the glyceride oil with the basic ionic liquid.

In some embodiments, the total concentration of monochloropropanol and fatty acid esters thereof in the glyceride oil which is contacted with the basic ionic liquid is at least 0.01 ppm, for example at least 0.1 ppm, at least 0.5 ppm or at least 1.0 ppm, as determined by DGF standard method C-VI 18 (10) A or B. In exemplary embodiments, the total concentration of monochloropropanol and fatty acid esters thereof, in the glyceride oil which is contacted with the basic ionic liquid may be from 0.01 ppm to 30 ppm, from 1 ppm to 25 ppm, or from 1.5 ppm to 20 ppm.

Preferably, the treated glyceride oil separated in step (ii) has a total concentration of monochloropropanol and fatty acid esters thereof which is at least 50 wt. %, more preferably at least 75 wt. %, lower than that of the glyceride oil contacted in step (i).

In some embodiments, the total concentration of glycidyl fatty acid esters in the glyceride oil with the basic ionic liquid is at least 0.1 ppm, for example at least 1.0 ppm, at least 2.0 ppm or at least 5 ppm, as determined by a combination of DGF standard method C-VI 17 (10) and DGF standard method C-VI 18 (10) A or B. In exemplary embodiments, the total concentration of glycidyl fatty acid esters in the glyceride oil which is contacted with the basic ionic liquid may be from 0.1 ppm to 30 ppm, from 1 ppm to 25 ppm, or from 1.5 ppm to 20 ppm.

Preferably, the treated glyceride oil separated in step (ii) has a total concentration of glycidyl fatty acid esters which is at least 50 wt. %, more preferably at least 75 wt. %, lower than that of the glyceride oil contacted in step (i).

The term "glyceride oil" used herein refers to an oil or fat which comprises triglycerides as the major component thereof. For example, the triglyceride component may be at least 50 wt. % of the glyceride oil. The glyceride oil may also include mono- and/or di-glycerides. Preferably, the glyceride oil is at least partially obtained from a natural source (for example, a plant, animal or fish/crustacean source) and is also preferably edible. Glyceride oils include vegetable oils, marine oils and animal oils/fats which typically also include phospholipid components in their crude form.

Vegetable oils include all plant, nut and seed oils. Examples of suitable vegetable oils which may be of use in the present invention include: açai oil, almond oil, beech oil, cashew oil, coconut oil, colza oil, corn oil, cottonseed oil, grapefruit seed oil, grape seed oil, hazelnut oil, hemp oil, lemon oil, macadamia oil, mustard oil, olive oil, orange oil, peanut oil, palm oil, pecan oil, pine nut oil, pistachio oil, poppyseed oil, rapeseed oil, rice bran oil, safflower oil, sesame oil, soybean oil, sunflower oil, walnut oil and wheat germ oil. Preferred, vegetable oils are those selected from coconut oil, corn oil, cottonseed oil, groundnut oil, olive oil, palm oil, rapeseed oil, rice bran oil, safflower oil, soybean oil and sunflower oil. Most preferably, the vegetable oil is palm oil or soybean oil.

Suitable marine oils include oils derived from the tissues of oily fish or crustaceans (e.g. krill). Examples of suitable animal oils/fats include pig fat (lard), duck fat, goose fat, tallow oil, and butter.

FFA which may be present in the glyceride oils include monounsaturated, polyunsaturated and saturated FFA. Examples of unsaturated FFA include: myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid and docosahexaenoic acid. Examples of saturated FFA include: caprylic acid, capric acid, undecylic acid, lauric acid, tridecylic acid, myristic acid, palmitic acid, margaric acid, stearic acid, nonadecylic acid, arachidic acid, heneicosylic acid, behenic acid, lignoceric acid and cerotic acid.

Preferably the glyceride oil used in the present invention is a vegetable oil. More preferably, the glyceride oil is a vegetable oil selected from coconut oil, corn oil, cottonseed oil, groundnut oil, olive oil, palm oil, rapeseed oil, rice bran oil, safflower oil, soybean oil and sunflower oil. Most preferably, the vegetable oil is palm oil or soybean oil.

The term "soybean oil" used herein includes oil extracted from the seeds of the soybean (*Glycine max*). The term "palm oil" used herein includes an oil at least partially derived from a tree of genus *Elaeis*, forming part of the *Arecaceae* genera, and including the species *Elaeis guineensis* (African oil palm) and *Elaeis oleifera* (American oil palm), or hybrids thereof. Reference to palm oil herein therefore also includes palm kernel oil as well as fractionated palm oil, for example palm oil stearin or palm oil olein fractions. The term "rapeseed oil" used herein is synonymous with canola oil and refers to the oil derived from a species of rape plant, for example rapeseed (*Brassica napus* L.) or field mustard/turnip rape (*Brassica rapa* subsp. *oleifera*, syn. *B. campestris* L.).

The term "crude" used herein in reference to glyceride oil is intended to mean glyceride oil which has not undergone refining steps following oil extraction. For example, crude glyceride oil will not have undergone degumming, deacidification, winterisation, bleaching, depigmentation or deodorization. "Refined" used herein in reference to glyceride oil is intended to mean a glyceride oil which has undergone one or more refining steps, such as degumming, deacidification, winterisation, bleaching, depigmentation and/or deodorization.

"Chloropropanol" referred to herein corresponds to chloropropanols which may, for instance, derive from glycerol and which include monochloropropanol: 2-chloro-1,3-propanediol (2-MCPD) and 3-chloro-1,2-propanediol (3-MCPD), as well as dichloropropanol: 2,3-dichloropropan-1-ol (2,3-DCP) and 1,3-dichloropropan-2-ol (1,3-DCP). Fatty acid esters of chloropropanols referred to herein correspond to the mono- or di-ester form of the chloropropanols formed from esterification with FFA.

Glycidol referred to herein corresponds to 2,3-epoxy-1-propanol. Fatty acid esters of glycidol referred to herein correspond to the ester form of glycidol formed from esterification of glycidol with FFA.

The term "ionic liquid" as used herein refers to a liquid that is capable of being produced by melting a salt, and when so produced consists solely of ions. An ionic liquid may be formed from a homogeneous substance comprising one species of cation and one species of anion, or it can be composed of more than one species of cation and/or more than one species of anion. Thus, an ionic liquid may be composed of more than one species of cation and one species of anion. An ionic liquid may further be composed of one species of cation, and one or more species of anion. Still further, an ionic liquid may be composed of more than one species of cation and more than one species of anion.

The term "ionic liquid" includes compounds having both high melting points and compounds having low melting points, e.g. at or below room temperature. Thus, many ionic liquids have melting points below 200° C., preferably below 150° C., particularly below 100° C., around room temperature (15 to 30° C.), or even below 0° C. Ionic liquids having melting points below around 30° C. are commonly referred to as "room temperature ionic liquids". In room temperature ionic liquids, the structures of the cation and anion prevent the formation of an ordered crystalline structure and therefore the salt is liquid at room temperature.

The term "ionic liquid" as used herein also includes "non-classical" ionic liquids which exhibit ionic liquid properties but exist stably only in the presence of a solvent or on a support. For example, basic ionic liquids used in accordance with the present invention also include quaternary ammonium hydroxide ionic liquids. These ionic liquids are typically considered to be "non-classical" ionic liquids because Hofmann elimination can make them unstable in neat form. Nevertheless, such ionic liquids are known to exist stably when immobilized on a support (see, for instance, *Chem. Commun.*, 2004, 1096-1097) or in the presence of a solvent, for example an aqueous solvent. Basic ionic liquids used in accordance with the present invention also include quaternary ammonium bicarbonate ionic liquids. These ionic liquids are also typically considered to be "non-classical" ionic liquids because they may also suffer from Hofmann elimination (although to far less extent than hydroxide based ionic liquids) as well as thermal decomposition of the bicarbonate anion to the carbonate form. Nevertheless, such ionic liquids are known to exist stably in the presence of a solvent, for example an aqueous solvent.

Thus, where a "non-classical" basic ionic liquid is used in accordance with the invention, a liquid may be used which includes the basic ionic liquid together with a solvent, such as an aqueous solvent. Additional co-solvents, such as an alcohol co-solvent, may also be present. Preferred embodiments, where the ionic liquids are used in combination with a solvent are discussed in more detail below.

Ionic liquids are most widely known as solvents, because of their negligible vapour pressure, temperature stability, low flammability and recyclability, which also make them environmentally friendly. Due to the vast number of anion/cation combinations that are available it is possible to fine-tune the physical properties of the ionic liquid (e.g. melting point, density, viscosity, and miscibility with water or organic solvents) to suit the requirements of a particular application.

Ionic liquids have thus been exploited as solvents for various organic compound and polymer syntheses in the past due to their advantageous properties. There have been a number of reports which speculate upon the differing roles ionic liquids may play when used as solvents. S.-I. Ishiguro et al., *Pure Appl. Chem.*, Vol. 82, No. 10, pp 1927 to 1941, 2010, reports the crucial role that solute-solvent interaction, or solvation of solute ions or molecules, plays in reactions where ionic liquids can be considered to act as solvents. Particular emphasis is placed on the important role liquid structure of such solvents plays on reactions in solution, where solvent particles may be liberated upon reaction before being transferred and accommodated in the bulk liquid structure.

S.-I. Ishiguro et al indicate that the liquid structure of ionic liquids is heterogeneous, unlike molecular solvents, which may bring about specific solvent properties, as well as specific solute reactivities in ionic liquids. However, they concede that the acid-base property of ionic liquids is, for instance, not satisfactorily established in terms of solution chemistry, particularly in comparison to normal molecular liquids. It is thus difficult to predict the role ionic liquids can serve in specific solution based reactions.

Where reference is made herein to an "ionic compound comprising the organic quaternary ammonium cation", it is intended to refer to an ionic compound which derives from the basic ionic liquid which is used for contacting the glyceride oil at least by virtue of the organic quaternary ammonium cation. In some examples, the ionic compound comprising the organic quaternary ammonium cation may also comprise a chloride anion, as would be expected as a result of the basic ionic liquid undergoing anion exchange. In other examples, the glyceride oil contains FFA and the ionic compound comprising the organic quaternary ammonium cation also comprises an anion of a fatty acid. The ionic compound which is separated from the treated glyceride oil may also be an ionic liquid as defined herein, which is different to the basic ionic liquid which is used for contacting the glyceride oil initially. In further examples, the ionic compound comprising the organic quaternary ammonium cation comprises the same anion as the ionic liquid used for contacting the glyceride oil initially, in other words the ionic compound separated from the treated glyceride oil is the same as the ionic liquid used for contacting the glyceride oil initially.

The ionic liquids used in the process of the present invention are based on organic quaternary ammonium cations. "Organic quaternary ammonium cation" used herein is intended to refer to a positively charged ammonium cation wherein the nitrogen atom is bonded only to substituted or unsubstituted $C_1$ to $C_{12}$ hydrocarbyl groups. The term "hydrocarbyl group" refers to a univalent or multi-valent radical derived from a hydrocarbon and may include alkyl, cycloalkyl, alkenyl, alkynyl, or aryl groups.

Preferably, the organic quaternary ammonium cation of the basic ionic liquid is selected from:

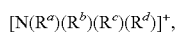

$[N(R^a)(R^b)(R^c)(R^d)]^+$, wherein: $R^a$, $R^b$, $R^c$ and $R^d$ are each independently selected from a $C_1$ to $C_8$, straight chain or branched alkyl group or a $C_3$ to $C_6$ cycloalkyl group; or any two of $R^a$, $R^b$, $R^c$ and $R^d$ combine to form an alkylene chain —$(CH_2)_q$— wherein q is from 3 to 6; and wherein said alkyl or cycloalkyl groups may optionally be substituted by one to three groups selected from: $C_1$ to $C_4$ alkoxy, $C_2$ to $C_8$ alkoxyalkoxy, $C_3$ to $C_6$ cycloalkyl, —OH, —SH, —$CO_2(C_1$ to $C_6)$alkyl, and —OC(O)($C_1$ to $C_6$)alkyl, for example by one to three —OH groups.

More preferably, the organic quaternary ammonium cation of the basic ionic liquid is selected from:

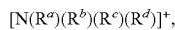

$[N(R^a)(R^b)(R^c)(R^d)]^+$, wherein: $R^a$, $R^b$, $R^c$ and $R^d$ are each independently selected from a $C_1$ to $C_8$, straight chain or branched alkyl group; and wherein said alkyl group may optionally be substituted by one to three groups selected from: $C_1$ to $C_4$ alkoxy, $C_2$ to $C_8$ alkoxyalkoxy, $C_3$ to $C_6$ cycloalkyl, —OH, —SH, —$CO_2(C_1$ to $C_6$)alkyl, and —OC(O)($C_1$ to $C_6$)alkyl, for example by one to three —OH groups.

Even more preferably, the organic quaternary ammonium cation is selected from:

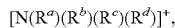

$[N(R^a)(R^b)(R^c)(R^d)]^+$, wherein: $R^a$, $R^b$, $R^c$ and $R^d$ are each independently selected from a $C_1$ to $C_4$, straight chain or branched alkyl group, including $C_1$, $C_2$ and $C_4$ alkyl, wherein at least one of $R^a$, $R^b$, $R^c$ or $R^d$ is substituted by a single —OH group.

Most preferably, the organic quaternary ammonium cation is choline:

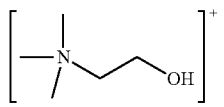

The basic ionic liquids used for the present invention incorporate basic anions selected from hydroxide, alkoxide, alkylcarbonate, hydrogen carbonate, carbonate, serinate, prolinate, histidinate, threoninate, valinate, asparaginate, taurinate and lysinate. These anions are not merely spectator anions selected by virtue of their ability to confer a certain melting point on the resulting ionic liquid. The basicity of the anions forming part of the ionic liquids used in conjunction with the present invention is believed to contribute to their ability to remove chloropropanol and glycidol, or their fatty acid esters, from glyceride oil. The term "basic" used herein refers to Brønsted bases having the ability to react with (neutralise) acids to form salts. The pH range of bases is from above 7.0 to 14.0 when dissolved or suspended in water.

In an embodiment of the present invention, the basic anion is selected from alkylcarbonate, hydrogen carbonate, carbonate, hydroxide and alkoxide; preferably hydrogen carbonate, alkylcarbonate and carbonate; and more preferably hydrogen carbonate.

Where the basic anion is selected from alkoxide or alkylcarbonate, the alkyl group may be linear or branched and may be substituted or unsubstituted. In one preferred embodiment, the alkyl group is unsubstituted. In another preferred embodiment, the alkyl group is unbranched. In a more preferred embodiment, the alkyl group is unsubstituted and unbranched.

The alkyl group may comprise from 1 to 10 carbon atoms, preferably from 1 to 8 carbon atoms and more preferably form 1 to 4 carbon atoms. The alkyl group may thus be selected from methyl, ethyl, propyl, butyl, pentyl, hexyl, heptyl, octyl, nonyl and/or decyl. It will be understood that branched alkyl groups such as iso-propyl, iso-butyl, sec-butyl and/or tert-butyl may also be used. Especially preferred are methyl, ethyl, propyl and butyl. In a further preferred embodiment, the alkyl group is selected from methyl and ethyl.

In an embodiment of the present invention, the basic anion is selected from serinate, prolinate, histidinate, threoninate, valinate, asparaginate, taurinate and lysinate.

In a preferred embodiment of the present invention, the basic anion is selected from serinate, lysinate, prolinate, taurinate and threoninate, more preferably from lysinate, prolinate and serinate, most preferably the basic anion is lysinate.

It will be appreciated that in order for glyceride oil obtained directly from the process of the invention to be fit for consumption, the basic ionic liquid used for removing the chloropropanols and/or glycidol, or fatty acid esters thereof, as well as the ionic compound comprising the organic quaternary ammonium cation separated in step (ii), should have little or no toxicity and/or be readily and substantially separable from the treated oil. A basic ionic liquid comprising a choline cation is particularly suitable for use with the process of the present invention. Choline is a water soluble essential nutrient grouped with the B-complex vitamins which is a precursor to acetylcholine, involved in numerous physiological functions. Choline has particularly low toxicity and excellent biodegradability, making it a natural ingredient that is capable of forming an ionic liquid which is particularly useful in the process of the present invention.

Thus, in particularly preferred embodiments of the present invention the basic ionic liquid is selected from choline bicarbonate:

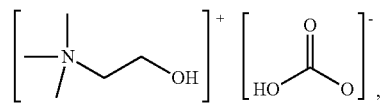

or choline alkylcarbonate:

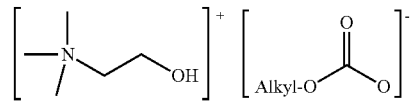

wherein the alkyl group is an alkyl group as described hereinbefore;
or choline hydroxide:

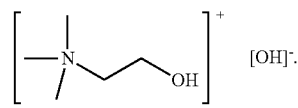

Basic ionic liquids comprising a basic anion selected from serinate, prolinate, histidinate, threoninate, valinate, asparaginate, taurinate and lysinate are also particularly suitable in the process of the present invention due to the particularly low toxicity of these amino acid derivatives.

In the most preferred embodiments of the present invention, the basic ionic liquid is choline bicarbonate:

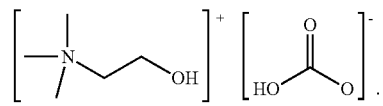

The basic ionic liquid used for contacting the glyceride oil, as well as the ionic compound separated from the treated glyceride oil, preferably have low oil solubility and preferentially partition into a non-oil phase, such as an aqueous phase, facilitating their removal from the treated oil. More preferably, the basic ionic liquid is immiscible with the oil. By immiscible with the oil it is meant that the basic ionic liquid is soluble in the glyceride oil at a concentration of less than 50 ppm, preferably less than 30 ppm, more preferably less than 20 ppm, most preferably, less than 10 ppm, for example, less than 5 ppm. Thus, the solubility of the basic ionic liquid may be tailored so that the basic ionic liquid is immiscible with the oil.

Suitably, contacting of the glyceride oil with basic ionic liquid is carried out at a temperature of less than 80° C., preferably from 25 to 65° C., more preferably from 35 to 55° C., for example, 40° C. As will be appreciated, where the glyceride oil is semi-solid at room temperature, higher temperatures are preferable such that the glyceride oil is in a liquid form for contacting with the basic ionic liquid. Suitably, the contacting step is carried out at a pressure of from 0.1 MPa absolute to 10 MPa absolute (1 bar absolute to 100 bar absolute).

In some embodiments, the contacting step may be carried out by contacting glyceride oil with the basic ionic liquid in a vessel wherein the resulting mixture is stirred using, for example, a mechanical stirrer, an ultrasonic stirrer, an electromagnetic stirrer or by bubbling an inert gas through the mixture.

Suitably, the basic ionic liquid and the glyceride oil may be contacted in a volume ratio of from greater than 1:40 to 1:300, and may be contacted in a mass ratio of from 1:50, preferably from 1:100. The contacting step may last from 1 minute to 60 minutes, preferably 2 to 30 minutes, more preferably, 5 to 20 minutes and most preferably, 8 to 15 minutes.

The basic ionic liquid may added in neat form or as part of a liquid additionally comprising a solvent or mixture of solvents which is/are compatible with the basic ionic liquid and the glyceride oil. A solvent or mixture of solvents may be used to modify the viscosity of the basic ionic liquid as desired. Alternatively, use of a solvent may confer desirable properties on the liquid structure of the liquid based reaction that are particularly suitable for promoting the reaction of the basic ionic liquid. Suitable solvents for this purpose include polar solvents, such as water, or alcohol, for example methanol or ethanol.

In some embodiments, the glyceride oil is contacted with a liquid comprising the basic ionic liquid and a solvent, wherein the concentration of basic ionic liquid in the liquid is from 15 wt. % to 90 wt. %. In exemplary embodiments, the solvent is an aqueous solvent, such as deionised water.

In preferred embodiments, where the basic anion of the basic ionic liquid is selected from alkylcarbonate, hydrogen carbonate and carbonate, especially where the basic anion is hydrogen carbonate, the glyceride oil is contacted with a liquid comprising the basic ionic liquid and a solvent, such as an aqueous solvent, and the concentration of basic ionic liquid in the liquid is 50 wt. % to 90 wt. %, for example from 75 wt. % to 85 wt. %.

In preferred embodiments, where the basic anion of the basic ionic liquid is selected from hydroxide and alkoxide, especially where the basic anion is hydroxide, the glyceride oil is contacted with a liquid comprising the basic ionic liquid and a solvent, such as an aqueous solvent, wherein the concentration of basic ionic liquid in the liquid is 15 wt. % to 60 wt. %, preferably from 40 wt. % to 50 wt. %.

In the above embodiments where the basic ionic liquid is part of a mixture with a solvent, additional co-solvents may also be present. For instance, where an aqueous solvent is employed, alcohol co-solvent(s) may also be present, for example, at between 1 wt. % and 20 wt. % of the liquid comprising the basic ionic liquid and aqueous solvent.

Separation of the ionic compound comprising the organic quaternary ammonium cation from the treated glyceride oil, may be carried out by gravity separation (for example, in a settling unit), where the treated glyceride oil is generally the upper phase and the ionic compound comprising the organic quaternary ammonium cation together with any solvent are incorporated in the lower phase in the settling unit. Separation of the ionic compound comprising the organic quaternary ammonium cation may also be achieved using, for example, a decanter, a hydrocyclone, electrostatic coalesce, a centrifuge or a membrane filter press. Preferably, the phases are separated using a centrifuge. Contacting and separation steps may be repeated several times, for example 2 to 4 times.

Where the ionic compound comprising the organic quaternary ammonium cation which is separated from the glyceride oil is a solid which is precipitated after contacting the glyceride oil, for instance, following formation of a quaternary ammonium-FFA salt, the solid ionic compound may be separated from the oil by filtration. Alternatively, a polar solvent as described hereinbefore which is immiscible with the oil phase may be added to solubilise the solid ionic compound, following which the salt-containing phase may be separated from the oil by the methods described above.

Contacting and separation steps may also be carried out together in a counter-current reaction column. The glyceride oil (hereinafter "oil feed stream") is generally introduced at or near the bottom of the counter-current reaction column and the basic ionic liquid containing phase (hereinafter "basic ionic liquid feed stream") at or near the top of the counter-current reaction column. A treated oil phase (hereinafter "product oil stream") is withdrawn from the top of the column and a phase containing an ionic compound comprising the organic quaternary ammonium cation and solvent when present (hereinafter "secondary stream") from at or near the bottom thereof. Preferably, the counter-current reaction column has a sump region for collecting the secondary stream. Preferably, the oil feed stream is introduced to the counter-current reaction column immediately above the sump region. More than one counter-current reaction column may be employed, for example 2 to 6, preferably 2 to 3 columns arranged in series. Preferably, the counter-current reaction column is packed with a structured packing material, for example, glass Raschig rings, thereby increasing the flow path for the oil and basic ionic liquid through the column. Alternatively, the counter-current reaction column may contain a plurality of trays.

In particularly preferred embodiments, contacting and separating steps are carried out together in a centrifugal contact separator, for example, a centrifugal contact separator as described in U.S. Pat. Nos. 4,959,158, 5,571,070, 5,591,340, 5,762,800, WO 99/12650, and WO 00/29120. Suitable centrifugal contact separators include those supplied by Costner Industries Nevada, Inc. Glyceride oil and the basic ionic liquid containing phase may be introduced into an annular mixing zone of the centrifugal contact separator. Preferably, the glyceride oil and basic ionic liquid containing phase are introduced as separate feed streams into the annular mixing zone. The glyceride oil and the basic ionic liquid containing phase are rapidly mixed in the annular mixing zone. The resulting mixture is then passed to a separation zone wherein a centrifugal force is applied to the mixture to produce a clean separation of an oil phase and a secondary phase.

Preferably, a plurality of centrifugal contact separators are used in series, preferably, 2 to 6, for example 2 to 3. Preferably, the oil feed stream is introduced into the first centrifugal contact separator in the series while the liquid comprising the basic ionic liquid feed stream is introduced into the last centrifugal contact separator in the series such that oil of progressively decreasing content of, for instance, FFA or free chloride anions is passed from the first through to the last centrifugal contact separator in the series while a basic ionic liquid stream of progressively increasing content of, for instance, quaternary ammonium-FFA salt and/or quaternary ammonium chloride content is passed from the last through to the first centrifugal contact separator in the series. Thus, a phase containing an ionic compound comprising the organic quaternary ammonium cation is removed from the first centrifugal contact separator and the treated oil phase is removed from the last centrifugal contact separator in the series.

If necessary, residual basic ionic liquid that is present in the treated glyceride may be recovered by passing the product oil stream through a silica column such that the residual basic ionic liquid is adsorbed onto the silica column. The adsorbed basic ionic liquid may then be washed off the silica column using a solvent for the basic ionic liquid and the basic ionic liquid may be recovered by driving off the solvent at reduced pressure.

The treated glyceride oil may also be passed through a coalescer filter for coalescing fine droplets of non-oil phase liquid, for instance liquid comprising an ionic compound of the organic quaternary ammonium cation, so as to produce a continuous phase and facilitate phase separation. Preferably, where the basic ionic liquid used for contacting the glyceride oil comprises a solvent, the coalescer filter is wetted with the same solvent to improve filtration.

In some embodiments, the basic ionic liquid may be provided on a support material. Suitable supports for use in the present invention may be selected from silica, alumina, alumina-silica, carbon, activated carbon or a zeolite. Preferably, the support is silica. The supported form may be provided for contact with the oil as a slurry comprising a suitable solvent, wherein the solvent is selected from a solvent as described hereinbefore.

Where supported basic ionic liquid is used, contacting and separation steps may also be carried out together by passing the oil through a column packed with a supported basic ionic liquid (i.e. a packed bed arrangement). In addition, or alternatively, a fixed-bed arrangement having a plurality of plates and/or trays may be used.

Methods for supporting basic ionic liquids on a support material are well known in the art, such as for example, in US 2002/0169071, US 2002/0198100 and US 2008/0306319. Typically, the basic ionic liquid may be physisorbed or chemisorbed on the support material, and preferably physisorbed. In the processes of the present invention, the basic ionic liquid may be adsorbed onto the support in a basic ionic liquid:support mass ratio of from 10:1 to 1:10, preferably in a basic ionic liquid:support mass ratio of from 1:2 to 2:1.

It has been found that the basic ionic liquid used in accordance with the present invention is capable of removing chloropropanol and glycidol, and their fatty acid esters, from glyceride oil. Several reaction mechanisms are believed to be possible as a result of contacting the oil with the basic ionic liquid. Without being bound by any particular theory, the basic ionic liquid may promote preferential partitioning of chloropropanol and glycidol, and their fatty acid esters, into an ionic liquid containing phase. Alternatively, the basic ionic liquid may promote hydrolysis of chloropropanol and/or glycidol, or their fatty acid esters, in the presence of water. For example, base promoted hydrolysis may lead to cleavage of the chlorine-carbon bond of chloropropanol and fatty acid esters thereof whilst base promoted hydrolysis may lead to ring opening of the epoxide of glycidol and fatty acid esters thereof.

Unbound chloropropanol and glycidol may be present in glyceride oils to various extents. For instance, unbound chloropropanol corresponds to one of numerous organochlorine compounds which may be endogenously produced by plants during maturation (Matthäus, B., *Eur. J. Lipid Sci. Technol.* 2012, 59, 1333-1334; Nagy, K.; Sandoz, L.; Craft, B. D.; Destaillats, F.; *Food Addit. Contam.* 2011, 28, 1492-1500; and "Processing Contaminants in Edible Oils-MCPD and Glycidyl Esters", *AOCS Press,* 2014, Chapter 1). Meanwhile, formation of chloropropanol fatty acid esters and glycidyl fatty acid esters has been found to depend predominantly on: (i) the mono- and di-glyceride content of glyceride oil; (ii) the chloride content of glyceride oil; (iii) the proton activity of glyceride oil; and (iv) the extent of heat exposure during refining.

The basic ionic liquid treatment may be applied to crude glyceride oil which has not undergone any previous refining steps following oil extraction, provided it contains chloropropanol and/or glycidol, or their fatty acid esters, requiring removal. However, concentrations of chloropropanol and glycidol, and their fatty acid esters, are at their highest in deodorized glyceride oil, which has had substantial heat exposure. Thus, in preferred embodiments, the glyceride oil which is contacted in step (i) of the removal process described hereinbefore is a deodorized glyceride oil, preferably where the glyceride oil was deodorized by contacting the oil with a stripping agent, such as steam, at reduced pressure.

Where the ionic liquid treatment is incorporated into a glyceride oil refining process in accordance with an aspect of the present invention, the refining process described hereinbefore comprises subjecting the glyceride oil to at least one refining step before and/or after, preferably before, contacting the glyceride oil with the basic ionic liquid.

A variety of additional refining stages may be undertaken prior to or after the treatment with basic ionic liquid. The skilled person is aware of the different refining steps typically used in edible oil processing, including for example refining steps discussed in: "*Practical Guide to Vegetable Oil Processing*", 2008, Monoj K. Gupta, AOCS Press, as well as in the Edible Oil Processing section of the "AOCS Lipid Library" website (lipidlibrary.aocs.org).

In some embodiments, the at least one refining step conducted in addition to the basic ionic liquid treatment may include refining steps selected from: degumming, bleaching, winterization, depigmentation and deodorization. In particularly preferred embodiments, the at least one refining step conducted in addition to the basic ionic liquid treatment comprises, degumming, bleaching and/or deodorization. In preferred embodiments, the at least one refining step conducted in addition to the basic ionic liquid treatment comprises deodorization.

Degumming typically involves contacting the oil with aqueous phosphoric acid and/or aqueous citric acid to remove both hydratable and non-hydratable phosphatides (NHP). Typically, citric acid or phosphoric acid is added as a 50 wt % aqueous solution. Suitably, the aqueous acid is used in an amount of about 0.02% to about 0.20% of acid by weight of oil, preferably 0.05% to about 0.10% of acid by weight of oil. Suitably, the degumming step is carried out at a temperature of from about 50 to 110° C., preferably 80° C. to 100° C., for example 90° C. The degumming step may suitably last from 5 minutes to 60 minutes, preferably 15 to 45 minutes, more preferably, 20 to 40 minutes, for example 30 minutes. After settling of the mucilage following the acid treatment, the aqueous phase is separated before the degummed oil is typically dried. Drying of the degummed oil suitably takes place at a temperature of from 80 to 110° C. for a suitable time period, for example 20 to 40 min, at reduced pressure, for instance, at 2 to 3 kPa (20 to 30 mbar).

As the skilled person is aware, for glyceride oils with low phosphatide content (for example, less than 20 ppm by weight of phosphorus) a dry degumming process may be used in which the phosphoric acid or citric acid is added without significant dilution with water (for example, an 85% acid solution). NHP are converted into phosphatidic acid and a calcium or magnesium bi-phosphate salt which can be removed from the oil in a subsequent bleaching step. For oils rich in phosphatides, particularly NHP, dry degumming is known to be less well suited since excessive amounts of bleaching earth are required.

Bleaching is incorporated into an edible oil refining process to reduce colour bodies, including chlorophyll, residual soap and gums, trace metals and oxidation products. Bleaching typically involves contacting the oil with an amount of bleaching clay or earth, for example from 0.5 to 5 wt. % clay based on the mass of the oil. Bleaching clays or earths are typically composed of one or more of three types of clay minerals: calcium montmorillonite, attapulgite, and sepiolite. Any suitable bleaching clay or earth may be used in accordance with the present invention, including neutral and acid activated clays (e.g. bentonite). The oil is suitably contacted with bleaching clay for 15 to 45 minutes, preferably 20 to 40 minutes before the earth is separated, typically by filtration. The oil is typically contacted with bleaching clay or earth at a temperature of from 80° C. to 125° C., preferably at a temperature of from 90° C. to 110° C. Following an initial period of contact ("wet bleaching") conducted under atmospheric pressure, a second stage of the bleaching process is conducted under reduced pressure ("dry bleaching"), for example at 2 to 3 kPa (20 to 30 mbar).

Advantageously, it has been found that the basic ionic liquid treatment is also capable of at least partially degumming the oil and removing pigments which means that the extent of degumming and bleaching steps can be scaled back, for example, in terms of treatment time or materials.

Deodorization corresponds to a stripping process in which an amount of stripping agent is passed through an oil in a distillation apparatus, typically by means of direct injection, at reduced pressure for a period of time so as to vaporize and extract volatile components, such as FFA, aldehydes, ketones, alcohols, hydrocarbons, tocopherols, sterols, and phytosterols. The stripping agent is preferably steam, although other agents such as nitrogen may be used. The amount of stripping agent suitably used is from about 0.5% to about 5% by weight of oil.

The temperature range of deodorization for the refining process according to an aspect of the present invention is suitably from 160° C. to 270° C. Where reference is made herein to the temperature of the deodorization step, this refers to the temperature the oil is heated to before being exposed to the stripping agent. The pressure range of deodorization is suitably from 0.1 to 0.4 kPa (1 to 4 mbar), preferably 0.2-0.3 kPa (2 to 3 mbar). Suitable time periods for deodorization are typically from 30 to 180 minutes, for example 60 to 120 minutes, or 60 to 90 minutes.

The skilled person is able to determine a suitable length of deodorization by analysing the appearance and composition of the glyceride oil. For instance, determining the p-anisidine value (AnV) of the oil. The p-anisidine value of an oil is a measure of its oxidative state and, more specifically, provides information regarding the level of secondary oxidation products contained in an oil, although primarily aldehydes such as 2-alkenals and 2,4-dienals. The p-anisidine value (AnV) therefore also gives an indication of the level of oxidation products which are intended to be removed by means of the deodorization step. For instance, satisfactory deodorization may be achieved where, for example, the AnV is less than 10, preferably less than 5, as determined by AOCS Official Method Cd 18-90.

In addition or alternatively, the amount of aldehyde and ketone components of the oil can be determined, which are typically associated with a crude oil's odour, to determine whether sufficient deodorization has taken place. Typical volatile odiferous aldehyde and ketone components of crude or rancid palm oil include: acetaldehyde, benzaldehyde, n-propanal, n-butanal, n-pentanal, n-hexanal, n-octanal, n-nananal, 2-butenal, 3-methylbutanal, 2-methylbutanal, 2-pentenal, 2-hexenal, 2E,4E-decadienal, 2E,4Z-decadienal, 2-butanone, 2-pentanone, 4-methyl-2-pentanone, 2-heptanone, 2-nonanone. Preferably, each of these components is individually present in a deodorized oil in an amount less than 3 mg/kg of oil, more preferably less than 1 mg/kg of oil, most preferably less than 0.5 mg/kg of oil.

The amount of aldehydes and ketones may be readily determined by chromatographic methods, for instance GC-TOFMS or GCxGC-TOFMS. Alternatively, derivatization of aldehydes and ketones may be used to improve chromatographic analysis. For example, it is known that aldehydes and ketones may be derivatized with 2,4-dinitrophenylhydrazine (DNPH) under acidic conditions. This reagent does not react with carboxylic acids or esters and therefore the analysis is not affected by the presence of such components in a glyceride oil sample. Following derivatization, HPLC-UV analysis can quantify the total amount of aldehydes and ketones which are present in a sample.

As discussed hereinabove, conventional glyceride oil refining processes include a high temperature (for example 240 to 270° C.) deodorization step which provides a significant amount of heat energy which contributes substantially to the formation of chloropropanol fatty acid esters and glycidyl fatty acid esters, when the oil comprises a source of chloride and/or depending on the proton activity of the oil. As a result, in preferred embodiments, where the at least one refining step comprises deodorization, this is undertaken before the basic ionic liquid treatment. This ensures that the basic ionic liquid treatment is applied to a deodorized glyceride oil wherein the concentration of chloropropanol fatty acid esters and glycidol fatty acid esters is likely to be at its highest.

However, another advantage of the treatment with the basic ionic liquid in accordance with the present invention is that the treatment has also been found to at least partially remove pigments and odiferous compounds which are typically removed in a high temperature (for example, 240° C. to 270° C.) deodorization step during conventional refining processes. Treatment of glyceride oil with the basic ionic liquid means that lower temperatures and/or time periods can be used for the deodorization step as part of the overall refining process, particularly when the deodorization step is performed after the basic ionic liquid treatment. Thus, performing the basic ionic liquid treatment before a deodorization step has the advantage of reducing the energy requirements of the refining process. In addition, by reducing either the temperature or time period of exposure to heat during the deodorization step then side reactions that can lead to undesirable organoleptic properties of the oil, or formation of unwanted, potentially harmful by-products, may also advantageously be reduced.

Thus, in some embodiments, where the at least one refining step performed in addition to the basic ionic liquid treatment comprises deodorization, this may be also be undertaken after the basic ionic liquid treatment. Conventional deodorisation temperatures are typically in excess of 220° C., for example 240° C. to 270° C., and typically operated for 60 to 90 minutes. Where lower than conventional temperatures are used for deodorisation as allowed in these embodiments of the present invention, for example 160° C. to 200° C., the time periods for deodorization may be lengthened to ensure sufficient deodorization, yet still involve less energy consumption than a conventional deodorization operated at higher temperature, for example 240° C. to 270° C., for a shorter period.

In preferred embodiments, the same or lower than conventional deodorization time periods are used in combination with the lower than conventional deodorization temperature, yet achieve the same extent of deodorization as a result of the subsequent basic ionic liquid treatment. In other preferred embodiments, where conventional temperatures are used for the deodorization step included in the refining process of the invention, for example 240° C. to 270° C., the time period for the deodorization may be reduced compared to that which is conventionally used and still achieve a comparable level of deodorization as a result of the prior basic ionic liquid treatment.

In particularly preferred embodiments, the temperature of the deodorization is from 160° C. to 200° C., more preferably 170° C. to 190° C. Preferably, the time period over which deodorization is conducted at these temperatures is from 30 to 150 minutes, more preferably 45 to 120 minutes, most preferably 60 to 90 minutes.

Conventional glyceride oil refining processes typically include a FFA neutralisation step with a strong base, for example sodium hydroxide or potassium hydroxide (corresponding to a so called "chemical refining" process). Alternatively, deacidification can be achieved by adjusting the deodorization parameters accordingly to ensure that volatile FFA is removed in that step (a so called "physical refining" process). A disadvantage of a FFA neutralisation step ("chemical refining") is that it is accompanied by unwanted saponification, lowering triglyceride content, whilst soap formation can lead to substantial neutral oil losses as a result of emulsification. The basic ionic liquid treatment described herein is effective at neutralising FFA in the oil yet does not lead to saponification of neutral oil. The basic ionic liquid treatment may therefore entirely replace a conventional neutralisation step used in a chemical refining process such that the deodorization step may not need to be lengthened as is normally the case for ensuring FFA removal in conventional physical refining. Thus, in preferred embodiments of the present invention, the at least one refining step conducted before and/or after the basic ionic liquid treatment as part of the refining process does not include a neutralisation step with an inorganic base (e.g. sodium hydroxide).

FFA present in the oil may be neutralised upon contact with the basic ionic liquid to form a quaternary ammonium-FFA salt. In preferred embodiments, the amount of basic ionic liquid employed in the contacting step is at least stoichiometric with the molar amount of FFA contained in the oil. For example, the molar ratio of the basic ionic liquid to FFA in the oil may be from 1:1 to 10:1, or from 1.5:1 to 5:1. The content of FFA in the glyceride oil may be determined prior to treatment with basic ionic liquid using common titration techniques, of which the person of skill in the art is aware. For instance, titration with sodium hydroxide using phenolphthalein indicator may be used to determine the FFA content of glyceride oil.

In preferred embodiments, the basic ionic liquid is selected to provide low melting fatty acid salts with linear $C_{12}$ to $C_{18}$ FFAs. Particularly preferred basic ionic liquids form salts with such FFAs having melting points of less than 100° C. Such salts may be conveniently separated from the treated glyceride oil using liquid-liquid separation techniques discussed herein.

It has been found that the absence or presence of FFA in the oil does not affect the capacity of the basic ionic liquid treatment for removing chloropropanol and glycidol, and their fatty acid esters, from glyceride oil. Thus, whether or not the basic ionic liquid is involved in neutralisation of FFA to form a quaternary ammonium-FFA salt or not, removal of chloropropanol and glycidol, and their fatty acid esters, is not significantly impacted. Thus, the basic ionic liquid treatment may be applied to oils that have undergone various degrees of deodorization leading to increased levels of fatty acid esters of chloropropanol and glycidol, yet may or may not have substantially removed FFA.

Thus, in embodiments where the glyceride oil which is contacted with the basic ionic liquid comprises FFA, the ionic compound comprising the organic quaternary ammonium cation which is separated from the treated glyceride oil may comprise an anion of a fatty acid. In some embodiments, the ionic compound comprising the organic quaternary ammonium cation which is separated from the treated glyceride oil may comprise a chloride anion.

Preferably, the basic ionic liquid treatment of the present invention is used to remove chloropropanol, or fatty acid esters thereof, and/or glycidyl fatty acid esters from glyceride oil. More preferably, the basic ionic liquid treatment of the present invention is used to remove monochloropropanol, or fatty acid esters thereof, from glyceride oil. Even more preferably, the basic ionic liquid treatment of the present invention is used to remove unbound monochloropropanol from glyceride oil. Most preferably, the basic ionic liquid treatment of the present invention is used to remove unbound 3-MCPD from glyceride oil.

The basic ionic liquid treatment used in accordance with the present invention is intended to obviate the use of ion exchange resins and ultrafiltration membranes and the like for removing contaminants which can contribute significantly to the materials costs associated with glyceride oil refining. Thus, in preferred embodiments, the refining process described herein does not comprise treatment of the glyceride oil with ion exchange resins or ultrafiltration membranes.

In some embodiments, the basic ionic liquid used for contacting the glyceride oil may be regenerated from the ionic compound comprising the organic quaternary ammonium cation separated from the treated glyceride oil (where these ionic species are different) by means of a regeneration process in order to recycle the basic ionic liquid to the refining process of the invention, if desired. For instance, a regeneration process may comprise anion or cation exchange steps to obtain a basic ionic liquid comprising the desired basic anion as described hereinbefore.

In an embodiment, the regeneration process comprises forming choline bicarbonate from a choline-FFA salt; comprising the steps of:
  (a) contacting the choline-FFA salt with carbonic acid; and
  (b) obtaining choline bicarbonate from the reaction mixture.

Preferably, step (a) is performed by contacting an aqueous solution comprising the choline chloride salt with $CO_2$ (e.g. by bubbling $CO_2$ through the aqueous solution).

Preferably, step (b) is performed by contacting the mixture of step (b) with a solvent which is miscible with choline bicarbonate and separating the solvent from choline bicarbonate.

Although the content of fatty acid esters of chloropropanol and/or glycidol contained in glyceride oil is increased as a result of deodorization, the deodorization step is known to remove certain polar compounds from the oil, particularly oxidation products from which much of the crude glyceride oil's odour derives. These oxidation products primarily include aldehydes and ketones, which are usually volatile. A deodorized glyceride oil therefore will typically have a lower content of aldehydes and ketones than a crude glyceride oil that has not undergone any deodorization.

Thus, in another aspect, the present invention provides a composition comprising a glyceride oil and a basic ionic liquid as described hereinbefore; wherein the glyceride oil of the composition has a total aldehyde and ketone content of less than 20 mg/kg, preferably a total aldehyde and ketone content of less than 5 mg/kg, as determined by any of the methods described hereinbefore. The glyceride oil of the composition according to this aspect may be a deodorized glyceride composition. Preferred embodiments of other aspects of the invention relating to the nature of the anion and cation of the basic ionic liquid, as well as the nature of the glyceride oil, equally apply to this aspect of the invention. For instance, it is most preferred that the glyceride oil is palm oil and that the basic ionic liquid is choline bicarbonate.

In yet a further aspect, the present invention provides a composition, comprising a glyceride oil and a basic ionic liquid as described hereinbefore; wherein the p-anisidine value of the oil is less than 10, preferably the p-anisidine value of the oil is less than 5. The p-anisidine value (AnV) may suitably be determined by AOCS Official Method Cd 18-90. The glyceride oil of the composition according to this aspect may be a deodorized glyceride composition. Preferred embodiments of other aspects of the invention relating to the nature of the anion and cation of the basic ionic liquid, as well as the nature of the glyceride oil, equally apply to this aspect of the invention. For instance, it is most preferred that the glyceride oil is palm oil and that the basic ionic liquid is choline bicarbonate.

In some embodiments, the total concentration of chloropropanol and fatty acid esters thereof in the glyceride oil in the above aspects is at least 0.01 ppm, for example at least 0.1 ppm, at least 0.5 ppm or at least 1.0 ppm, as determined by DGF standard method C-VI 18 (10) A or B. In exemplary embodiments, the total concentration of chloropropanol and fatty acid esters thereof, in the glyceride oil may be from 0.01 ppm to 30 ppm, from 1 ppm to 25 ppm, or from 1.5 ppm to 20 ppm.

In some embodiments, the total concentration of glycidyl fatty acid esters in the glyceride oil in the above aspects is at least 0.1 ppm, for example at least 1.0 ppm, at least 2.0 ppm or at least 5 ppm, as determined by a combination of DGF standard method C-VI 17 (10) and DGF standard method C-VI 18 (10) A or B. In exemplary embodiments, the total concentration of glycidyl fatty acid esters in the glyceride oil may be from 0.1 ppm to 30 ppm, from 1 ppm to 25 ppm, or from 1.5 ppm to 20 ppm.

The present invention also provides a use of a basic ionic liquid as described hereinbefore for removing chloropropanol or glycidol, or their fatty acid esters, from glyceride oil by contacting the oil with basic ionic liquid. Preferred embodiments of other aspects of the invention relating to the nature of the anion and cation of the basic ionic liquid, as well as the nature of the glyceride oil, equally apply to this aspect of the invention. For instance, it is most preferred that the glyceride oil is palm oil and that the basic ionic liquid is choline bicarbonate.

Preferably, the basic ionic liquid is used to remove chloropropanol, or fatty acid esters thereof, and/or glycidyl fatty acid esters from glyceride oil. More preferably, the basic ionic liquid is used to remove monochloropropanol, or fatty acid esters thereof, from glyceride oil. Even more preferably, the basic ionic liquid is used to remove unbound monochloropropanol from glyceride oil. Most preferably, the basic ionic liquid is used to remove unbound 3-MCPD from glyceride oil.

As described hereinbefore, DGF standard method C-VI 17 (10) and DGF standard method C-VI 18 (10) A or B may be used for determining the concentration of chloropropanol and fatty acid esters thereof and glycidyl esters in the glyceride oil. Alternatively, direct procedures for determining the content of chloropropanol and glycidol and their fatty acid esters include the use of Liquid Chromatography—Time of Flight Mass Spectrometry (LC-TOFMS), as reported in J Am Oil Chem Soc. January 2011; 88(1): 1-14.

Embodiments of the invention described hereinbefore may be combined with any other compatible embodiments to form further embodiments of the invention.

The present invention will now be illustrated by way of the following examples.

EXAMPLES

General Method for Determination of Acid Value (Mg KOH/q of Oil) and FFA (Wt. %) Content of Glyceride Oil.

To a beaker containing 60 ml of isopropyl alcohol was added 0.5 mL of phenolphthalein. This mixture was heated until boiling and 0.02M potassium hydroxide in isopropyl alcohol was added until a faint pink colour persisted for approximately 10 s.

To a glass vial was added 0.200 g of the glyceride oil sample which was subsequently dissolved in 50 ml of the above hot isopropyl alcohol solution. The resulting solution was titrated whilst stirring with 0.02M potassium hydroxide solution using a 25 ml burette graduated in 0.1 ml to the end point of the phenolphthalein indicator i.e until the pink colour persisted for at least 30 s.

The Acid Value (mg KOH/g of oil) was subsequently calculated using the formula:

$$56.1 \times N \times V/m$$

where:
56.1 is the Mr of potassium hydroxide;
V is the volume (ml) of potassium hydroxide solution used;
N is the normality of the potassium hydroxide solution; and
m is the mass (g) of the glyceride oil sample.

Once the Acid Value has been determined, the FFA content may be derived. The FFA content for the purposes of the present disclosure is defined as a mass percentage while assuming the FFA to be an equal mixture of palmitic acid (Mr=256 g/mol) and oleic acid (Mr=282 g/mol), giving an average molecular weight of 269 g/mol. Oil with an FFA of 1 wt. % contains 0.01 g of oleic/palmitic acid per 1 g of oil, which amount of oleic/palmitic acid corresponds to $3.171 \times 10^{-5}$ mol (0.01/269). The amount of KOH required to neutralise this amount of oleic/palmitic acid (i.e. the Acid Value—AV) is calculated to be 2.086 mg of KOH/g of oil ($3.171 \times 10^{-5} \times 56.1$). Calculation of FFA content (wt. %) therefore has the following formula:

$$\text{Wt. \% FFA} = \text{Acid Value} \times 0.479$$

General Method for Ionic Liquid Treatment of Glyceride Oil.

1.5 g of refined oil sample is placed in a sample vial before being doped with a single dopant (e.g. chloropropanol, or fatty acid ester thereof, or glycidol, or fatty acid ester thereof). The resulting mixture is stirred for 3 h to ensure thorough mixing of the oil and dopant and the concentration of dopant in the oil is determined. Choline bicarbonate (100 mg, 80 w/w % in $H_2O$ supplied by Sigma-Aldrich UK) is added to the oil/dopant mixture and the resulting mixture stirred for approximately 12 h, either at room temperature or the lowest temperature at which the oil is in an entirely liquid state. The mixture is then centrifuged at 2500 rpm for 10 minutes. The upper oil phase is then removed and a small sample of the oil phase taken for analysis.

Example 1: Ionic Liquid Treatment of Butter

The above general method was used as part of an ionic liquid treatment of a refined cow's milk butter comprising 20 wt. % water and less than 0.2 wt % FFA. The butter was heated to 40° C. to ensure it was in a liquid state before being doped with 3-MCPD obtained from Sigma-Aldrich. Results of oil analysis before and after the ionic liquid treatment are provided in Table 1 below.

Example 2: Ionic Liquid Treatment of Butter

The above general method was used as part of an ionic liquid treatment of a refined cow's milk butter comprising 20 wt. % water and less than 0.2 wt % FFA. The butter was heated to 40° C. to ensure it was in a liquid state before being doped with 3-MCPD oleic acid ester obtained from Carbosynth Ltd UK. Results of oil analysis before and after the ionic liquid treatment are provided in Table 1 below.

Example 3: Ionic Liquid Treatment of Refined Corn Oil

The above general method was used as part of an ionic liquid treatment of a refined corn oil comprising less than 0.2 wt % FFA. The oil was doped with 3-MCPD obtained from Sigma-Aldrich at room temperature. Results of oil analysis before and after the ionic liquid treatment are provided in Table 1 below.

Example 4: Ionic Liquid Treatment of Refined Corn Oil

The above general method was used as part of an ionic liquid treatment of a refined corn oil comprising less than 0.2 wt % FFA. The oil was doped with 3-MCPD oleic acid ester obtained from Carbosynth Ltd UK. Results of oil analysis before and after the ionic liquid treatment are provided in Table 1 below.

Example 5: Ionic Liquid Treatment of Refined Olive Oil

The above general method was used as part of an ionic liquid treatment of a refined olive oil comprising less than 0.2 wt % FFA. The oil was doped with 3-MCPD obtained from Sigma-Aldrich at room temperature. Results of oil analysis before and after the ionic liquid treatment are provided in Table 1 below.

Example 6: Ionic Liquid Treatment of Refined Olive Oil

The above general method was used as part of an ionic liquid treatment of a refined olive oil comprising less than 0.2 wt % FFA. The oil was doped with 3-MCPD oleic acid ester obtained from Carbosynth Ltd UK. Results of oil analysis before and after the ionic liquid treatment are provided in Table 1 below.

TABLE 1

| Example | Dopant | Pre-IL treatment concentration (ppm) | Post-IL treatment concentration (ppm) |
| --- | --- | --- | --- |
| Ex. 1 | 3-MCPD | 57684 | 16 |
| Ex. 2 | 3-MCPD ester | 9406 | 9331 |
| Ex. 3 | 3-MCPD | 644 | 52 |
| Ex. 4 | 3-MCPD ester | 7354 | 5109 |
| Ex. 5 | 3-MCPD | 3191 | 50 |
| Ex. 6 | 3-MCPD ester | 6871 | 3191 |

The methodology used for analysis of the oils is that proposed by R. Weiβhaar, "Determination of total 3-chloropropane-1,2-diol (3-MCPD) in edible oils by cleavage of MCPD esters with sodium methoxide", Eur. J. Lipid Sci. Technol. (2008) 110, 183-186. This method involves cleavage of 3-MCPD fatty acid esters with sodium methoxide, extraction of 3-MCPD, derivatisation with phenylboronic acid and subsequent analysis using GC-MS (a deuterium-labelled internal standard (3-MCPD-$d_5$) is also added to each sample).

Quantitative analysis was carried out using a calibration curve with increasing standard solutions spiked with deuterium-labelled 3-MCPD. The ions m/z 147 (3-MCPD) and m/z 150 (3-MCPD-$d_5$) were the target ions. Ions at m/z 196 (3-MCPD) and m/z 201 (3-MCPD-$d_5$) were the qualifiers. The detection limit of this methodology is 0.15 mg/kg.

The above method may not distinguish between 3-MCPD esters and glycidyl fatty acid esters present in the oil. However, the concentration of each dopant used in the above examples is to such an excess relative to the concentration of glycidyl fatty acid esters in the oils tested (typically from 0.5 to 20 ppm in refined oils) that it is insignificant to the results of the analysis.

The results of Table 1 demonstrate the advantages of the present invention. It is apparent that the ionic liquid treatment is capable of removing 3-MCPD from glyceride oil with high efficiency. For instance, the results of Example 1 show that even where a relatively large amount of 3-MCPD is doped into butter to give a 3-MCPD concentration of 57684 ppm, 3-MCPD is substantially eliminated following the ionic liquid treatment—reducing the 3-MCPD concentration to only 16 ppm. This starting concentration of 3-MCPD is substantially larger than would ever be expected with undoped crude and refined oils (for example, up to about 20 ppm). Similar results are also shown for the vegetable oils.

The results of Table 1 also show that the ionic liquid treatment is capable of removing 3-MCPD fatty acid ester from glyceride oil. Reductions of 3-MCPD ester in corn and olive oils (Example 4 and 6) following the ionic liquid treatment are 31% and 54% respectively. The result for 3-MCPD ester removal from butter does not illustrate the same level of reduction. However, this result is believed to be impacted by the water content of the butter. Nevertheless, what is clear from the results is that the basic ionic liquid treatment would substantially eliminate all traces of 3-MCPD and 3-MCPD ester at the concentrations typically found in crude and refined glyceride oils.

Furthermore, it is noteworthy that the refined oils treated in the above Examples had a low level of FFA. The results of Table 1 therefore also demonstrate that removal of 3-MCPD and 3-MCPD esters using the basic ionic liquid treatment does not rely on the acid-base reaction of the basic ionic liquid with FFA, or the formation of a quaternary ammonium-FFA salt.

Example 7: Ionic Liquid Treatment of Crude Palm Oil

A sample (approximately 2 kg) of crude palm oil (CPO) having a measured FFA content of 3.8 wt. % was heated to 50° C. in a thermostatically controlled water bath. The homogeneous mixture of CPO was then added to a 2 L stirred tank reactor in which the reactor temperature was maintained at 50° C. by means of circulating heated oil. A stoichiometric amount of choline bicarbonate (80 wt. % in H$_2$O supplied by Sigma-Aldrich UK) relative to the FFA content of the CPO was then introduced to the reaction vessel at a rate of 1-2 mL per minute. The reaction was stirred at 500 rpm using a mechanical overhead stirrer for 1 h. After reaction, the mixture was centrifuged at 4000 rpm for 3 minutes to separate a phase comprising quaternary ammonium-FFA salts and a treated CPO phase.

The separated oil phase was titrated and found to contain 0.29 wt. % FFA. 3-MCPD fatty acid ester (3-MCPD-FA-Ester) content was determined before and after treatment with ionic liquid using standard method DGF-C-VI 18, Part A. Results are provided in Table 2 below.

TABLE 2

| Measurement | Unit | CPO | Ex. 7 |
| --- | --- | --- | --- |
| FFA content | Wt. % | 3.78 | 0.29 |
| 3-MCPD-FA-Ester | mg/kg | 0.2 | 0.1 |

The results of Table 2 also demonstrate the advantages of the present invention. In particular, the results show that the basic ionic liquid treatment reduces the 3-MCPD ester concentration by 50% whilst also significantly reducing the FFA content of the oil. Removal of 3-MCPD ester is therefore not precluded by the presence of significant amounts of FFA, or by simultaneous neutralisation of FFA with the basic ionic liquid.

Example 8: Ionic Liquid Treatment of a Refined Palm Oil

Five 30 g samples of commercially available refined, bleached and deodorized palm oil (RBDPO) having a measured FFA content of 0.1 wt. % were prepared and transferred to individual test tubes. Sample 8a was not doped with any additional material. Sample 8b was doped with 10 mg of 3-MCPD. Sample 8c was doped with 10 mg of 3-MCPD fatty acid ester (3-MCPD FA ester). Sample 8d was doped with 10 mg of glycidyl fatty acid ester (GE FA ester). Sample 8e was doped with 5 mg of 3-MCPD, 5 mg of 3-MCPD FA ester and 5 mg GE FA ester were added. The test tubes were sealed with parafilm and heated to 50° C. for 2 h in a thermostatically controlled oil bath.

To each sample, choline bicarbonate (3 ml of 80 wt % in H$_2$O solution) and H$_2$O (2 mL) was added before the samples were stirred for 24 h at 50° C. The organic phase was separated. The combined 3-MCPD and 3-MCPD-FA ester content was determined for the commercially available RBDPO and for the organic phase of all 5 samples using the standard method DGF-C-VI 18, Part A. The GE-FA ester content was determined for the commercially available RBDPO and for the organic phase of all 5 samples using the standard method DGF-C-VI 18, Part B. Results are provided in Table 3 below.

TABLE 3

| | Before treatment with IL | | After treatment with IL | |
| --- | --- | --- | --- | --- |
| Sample | 3-MCPD-FA ester/3-MCPD (mg/kg) | GE FA ester (mg/kg) | 3-MCPD-FA ester/3-MCPD (mg/kg) | GE FA ester (mg/kg) |
| 8a | 2.6 | 4.3 | 0.5 | 1.3 |
| 8b | 335.6[1] | 4.3[1] | 10.7 | 2.2 |
| 8c | 335.6[1] | 4.3[1] | 21.6 | 1.5 |
| 8d | 2.6[1] | 337.3[1] | 1.6 | 6.5 |
| 8e | 334.6[1] | 170.3[1] | 22.5 | 1.1 |

[1]Calculated based on the weight of 3-MCPD, 3-MCPD-FA ester and/or GE-FA ester added and the measured amount of 3-MCPD-FA ester and GE-FA ester in the commercially available RBDPO.

All samples show that the treatment of palm oil with choline bicarbonate ionic liquid leads to a reduction of the 3-MCPD/3-MCPD-FA ester and GE-FA ester content. Even with high amounts of 3-MCPD, 3-MCPD-FA ester and GE-FA ester, the ionic liquid is able to reduce their content significantly as shown in the results for samples 8b-8e. Furthermore, treatment of commercially available RBDPO reduces the 3-MCPD/3-MCPD-FA ester and GE-FA ester content by approximately 80% and 70%, respectively.

The invention claimed is:

1. A process for removing chloropropanol and/or glycidol, or their fatty acid esters, from glyceride oil comprising the steps of:
   (i) contacting glyceride oil comprising chloropropanol and/or glycidol, or their fatty acid esters, with a basic ionic liquid to form a treated glyceride oil, wherein the basic ionic liquid comprises a basic anion selected from hydroxide, alkoxide, alkylcarbonate, hydrogen carbonate, carbonate, serinate, prolinate, histidinate, threoninate, valinate, asparaginate, taurinate, and lysinate; and an organic quaternary ammonium cation; and
   (ii) separating the treated glyceride oil from an ionic compound comprising the organic quaternary ammonium cation after contacting the glyceride oil with the basic ionic liquid; wherein the treated glyceride oil has a reduced concentration of chloropropanol and/or glycidol, or their fatty acid esters, compared to the glyceride oil contacted in step (i).

2. A process according to claim 1, wherein the process further comprises subjecting the glyceride oil to at least one refining step before and/or after contacting the glyceride oil with the basic ionic liquid.

3. A process according to claim 2, wherein the at least one refining step is selected from: degumming, bleaching, winterization, depigmentation and deodorization.

4. A process according to claim 3, wherein the at least one refining step comprises deodorization.

5. A process according to claim 4, wherein the deodorisation includes steam stripping and is conducted at a temperature of from 160 to 270° C., or at a temperature of from 160° C. to 200° C., or at a temperature of from 170° C. to 190° C.

6. A process according to claim 1, wherein the total concentration of monochloropropanol and fatty acid esters thereof, in the glyceride oil which is contacted with the basic ionic liquid is from 0.01 ppm to 30 ppm.

7. A process according to claim 1, wherein the treated glyceride oil which is separated has a total concentration of monochloropropanol and fatty acid esters thereof which is at least 50 wt. %, or at least 75 wt. %, lower than that of the glyceride oil which is contacted with the basic ionic liquid; or wherein the treated glyceride oil which is separated has a total concentration of glycidyl fatty acid esters which is at least 50 wt. %, or at least 75 wt. %, lower than that of the glyceride oil contacted with the basic ionic liquid.

8. A process according to claim 1, wherein the step of contacting the glyceride oil with the basic ionic liquid is conducted at a temperature of less than 80° C., or from 25 to 65° C., or from 35 to 55° C.

9. A process according to claim 1, wherein the organic quaternary ammonium cation of the basic ionic liquid is selected from:

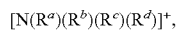

wherein: $R^a$, $R^b$, $R^c$ and $R^d$ are each independently selected from a $C_1$ to $C_8$, straight chain or branched alkyl group or a $C_3$ to $C_6$ cycloalkyl group; or any two of $R^a$, $R^b$, $R^c$ and $R^d$ combine to form an alkylene chain —$(CH_2)_q$— wherein q is from 3 to 6; and wherein said alkyl or cycloalkyl groups may optionally be substituted by one to three groups selected from: $C_1$ to $C_4$ alkoxy, $C_2$ to $C_8$ alkoxyalkoxy, $C_3$ to $C_6$ cycloalkyl, —OH, —SH, —$CO_2(C_1$ to $C_6)$alkyl and —OC(O)($C_1$ to $C_6$)alkyl, for example one to three —OH groups; or wherein the organic quaternary ammonium cation of the basic ionic liquid is selected from:

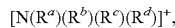

wherein: $R^a$, $R^b$, $R^c$ and $R^d$ are each independently selected from a $C_1$ to $C_4$, straight chain or branched alkyl group, including $C_1$, $C_2$ and $C_4$ alkyl, wherein at least one of $R^a$, $R^b$, $R^c$ or $R^d$ is substituted by a single —OH group.

10. A process according to claim 9, wherein the organic quaternary ammonium cation of the basic ionic liquid is choline:

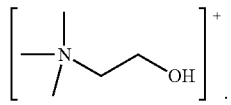

11. A process according to claim 1, wherein the basic anion is selected from alkylcarbonate, hydrogen carbonate and carbonate.

12. A process according to claim 1, wherein the basic anion is selected from hydroxide and alkoxide.

13. A process according to claim 1, wherein the glyceride oil is contacted with a liquid comprising the basic ionic liquid and a solvent, wherein the concentration of basic ionic liquid in the liquid is 15 wt. % to 90 wt. %.

14. A process according to claim 13, wherein the glyceride oil is contacted with a liquid comprising the basic ionic liquid and a solvent, wherein
i) the concentration of basic ionic liquid in the liquid is 50 wt. % to 90 wt. %, or from 75 wt. % to 85 wt, and the basic ionic liquid is as defined in claim 11; or
ii) the concentration of basic ionic liquid in the liquid is 15 wt. % to 60 wt. %, or from 40 wt. % to 50 wt, and the basic ionic liquid is as defined in claim 12.

15. A process according to claim 11, wherein the basic ionic liquid is choline bicarbonate and the glyceride oil which is contacted comprises FFA and the ionic compound separated from the glyceride oil is a choline-FFA salt, and wherein the process further comprises a step of regenerating the choline bicarbonate basic ionic liquid from the ionic compound which is a separated from the treated oil; said regeneration comprising the steps of:
(a) contacting the choline-FFA salt with carbonic acid; and
(b) obtaining choline bicarbonate from the reaction mixture.

16. A process according to claim 1, wherein the glyceride oil is a vegetable oil selected from coconut oil, corn oil, cottonseed oil, groundnut oil, olive oil, palm oil, rapeseed oil, rice bran oil, safflower oil, soybean oil and sunflower oil, or mixtures thereof.

17. A composition comprising a glyceride oil and a basic ionic liquid;
wherein the basic ionic liquid comprises a basic anion selected from hydroxide, alkoxide, alkylcarbonate, hydrogen carbonate, carbonate, serinate, prolinate, histidinate, threoninate, valinate, asparaginate, taurinate and lysinate; and a organic quaternary ammonium cation; and
wherein the glyceride oil of the composition has a total aldehyde and ketone content of less than 20 mg/kg; and/or wherein the p-anisidine value of the oil is less than 10.

18. A composition according to claim 17, wherein the total concentration of monochloropropanol and fatty acid esters thereof in the glyceride oil is at least 0.01 ppm; and/or the total concentration of glycidyl fatty acid esters in the glyceride oil in the above aspects is at least 0.1 ppm.

19. A composition according to claim 18, wherein the total concentration of monochloropropanol and fatty acid esters thereof, in the glyceride oil is from 0.01 ppm to 30 ppm, from 1 ppm to 25 ppm, or from 1.5 ppm to 20 ppm; and/or wherein the total concentration of glycidyl fatty acid esters in the glyceride oil is from 0.1 ppm to 30 ppm, from 1 ppm to 25 ppm, or from 1.5 ppm to 20 ppm.

20. A composition according to claim 17, wherein the basic ionic liquid is choline bicarbonate or choline hydroxide.

* * * * *